United States Patent
Liu et al.

(10) Patent No.: US 7,580,029 B2
(45) Date of Patent: Aug. 25, 2009

(54) APPARATUS AND METHOD FOR HANDWRITING RECOGNITION

(75) Inventors: Ying Liu, Beijing (CN); Jari A. Kangas, Tampere (FI); Zou Yanming, Beijing (CN); Gao Yipu, Beijing (CN)

(73) Assignee: Nokia Corporation, Espoo (FI)

( * ) Notice: Subject to any disclaimer, the term of this patent is extended or adjusted under 35 U.S.C. 154(b) by 498 days.

(21) Appl. No.: 10/817,287

(22) Filed: Apr. 2, 2004

(65) Prior Publication Data

US 2005/0219226 A1    Oct. 6, 2005

(51) Int. Cl.
 *G09G 5/00* (2006.01)
(52) U.S. Cl. ............... 345/169; 345/156; 345/173
(58) Field of Classification Search ............ 345/173; 382/189, 179
 See application file for complete search history.

(56) References Cited

U.S. PATENT DOCUMENTS

| | | | |
|---|---|---|---|
| 5,502,461 A | 3/1996 | Okamoto et al. | |
| 5,655,136 A * | 8/1997 | Morgan | 382/187 |
| 5,778,404 A * | 7/1998 | Capps et al. | 715/234 |
| 5,864,636 A | 1/1999 | Chisaka | 382/189 |
| 6,002,799 A | 12/1999 | Sklarew | 382/189 |
| 6,088,481 A | 7/2000 | Okamoto et al. | |
| 6,188,789 B1 | 2/2001 | Marianetti, II et al. | 382/189 |
| 6,424,743 B1 * | 7/2002 | Ebrahimi | 382/189 |
| 6,462,941 B1 | 10/2002 | Hulick et al. | |
| 6,493,464 B1 | 12/2002 | Hawkins et al. | 382/189 |
| 6,567,549 B1 | 5/2003 | Marianetti, II et al. | 382/189 |
| 6,633,672 B1 | 10/2003 | Guzik et al. | 382/189 |
| 6,661,409 B2 * | 12/2003 | Demartines et al. | 345/173 |
| 6,724,370 B2 * | 4/2004 | Dutta et al. | 345/169 |
| 6,839,464 B2 * | 1/2005 | Hawkins et al. | 382/187 |
| 7,002,560 B2 * | 2/2006 | Graham | 345/179 |
| 7,113,178 B1 * | 9/2006 | Webb | 345/173 |
| 2002/0190957 A1 * | 12/2002 | Lee et al. | 345/169 |
| 2003/0116873 A1 * | 6/2003 | Ayyagari et al. | 264/2.6 |
| 2004/0036680 A1 * | 2/2004 | Davis et al. | 345/169 |
| 2004/0196266 A1 * | 10/2004 | Matsuura et al. | 345/169 |
| 2004/0263486 A1 * | 12/2004 | Seni | 345/173 |

(Continued)

FOREIGN PATENT DOCUMENTS

GB    2 313 993 A    12/1997

(Continued)

OTHER PUBLICATIONS

PalmPilot™ Handbook, 3com, 1997, pp. 1-200.

(Continued)

*Primary Examiner*—Bipin Shalwala
*Assistant Examiner*—Afroza Y Chowdhury
(74) *Attorney, Agent, or Firm*—Perman & Green LLP

(57) ABSTRACT

An apparatus for handwriting recognition has a touch-sensitive display screen providing a handwriting input area capable of detecting a handwritten user input. The apparatus also has a processing device configured to interpret the handwritten user input as a symbol from a plurality of predefined symbols. The handwriting input area includes a writing start area, and the processing device is configured to provide a visual indication of the writing start area on the display screen. The processing device is configured to interpret the user input as a symbol only if the user input starts within the writing start area.

24 Claims, 5 Drawing Sheets

U.S. PATENT DOCUMENTS

2005/0057520 A1* 3/2005 Robinson .................... 345/169

FOREIGN PATENT DOCUMENTS

| JP | 59075376 | 4/1984 |
|----|----------|--------|
| JP | 61 243582 | 10/1986 |

OTHER PUBLICATIONS

Personal Entertainment Organizer, Sony, PEG-S300, Clie Memory Stick, Operating Instructions, 2000 Sony Corporation, 4-649-957-12 (2), pp. 1-187.

P800, User's Guide, Sony Ericsson, Nov. 2002, pp. 1-208.

Motorola A388, Digital Wireless Telephone, User's Guide, pp. 1-150.

User's Guide for Nokia 6108, pp. 1-98.

* cited by examiner

APPARATUS AND METHOD FOR HANDWRITING RECOGNITION

FIELD OF THE INVENTION

The present invention relates to electronic hand-writing equipment, and more particularly to an apparatus for handwriting recognition having a touch-sensitive display screen that provides a handwriting input area capable of detecting a handwritten user input, and a processing device configured to interpret the handwritten user input as a symbol from a plurality of predefined symbols. The invention also relates to a method for handwriting recognition.

BACKGROUND OF THE INVENTION

Examples of electronic handwriting equipment includes portable/personal assistants (PDAs), palmtop computers and mobile telecommunication terminals (mobile phones). They have in common that they make use of a stylus and a touch-sensitive display screen, a solution that offers improved usability and flexibility compared to conventional user interfaces with a keypad or keyboard.

In an apparatus that relies primarily on a stylus and a touch-sensitive display screen for user input, the the stylus plays two roles; sometimes it works like a normal pen for writing and sometimes like a mouse for controlling the user interface. How to detect which role the pen is taking is important for reasons of efficiency, usability as well as accuracy.

In this document, when the real physical stylus works as a normal pen is referred to as a "logical pen" mode. Conversely, when the stylus works like a normal mouse in a computerized user interface is referred to as a "logical mouse" mode.

A stylus-based user interface can receive three kinds of events from a physical stylus, as detected by the touch-sensitive display screen: pen down, pen move and pen up. Each event has two common properties: the happening position and the time of the event. These three kinds of events form event circles like "pen down–>pen move(s)–>pen up". There should be one pen down at the beginning of the event circle and one pen up at the end of the circle. The number of pen moves, however, can be any from 0 to virtually infinite.

When the stylus works as a logical pen, a grahical pen trace of the pen event circle is presented on the display screen. The pen traces are removed from the display screen when they make up and have been recognized as a complete symbol.

When the stylus works as a logical mouse, no trace is presented on the screen. However., objects or control elements such as buttons, icons and menu options on the display screen can be selected and operated by the stylus.

How to distinguish whether an event circle belongs to a logical pen mode or a logical mouse mode has been solved in the prior art in two different ways.

A first solution, which is illustrated in FIG. 4, is based on spatial information. The basic rules are:

When the pen is operated in a special area, this event is recognized as an event of a logical pen.

Otherwise, it is recognized as a logical mouse event.

The special area is normally called a writing area and is of limited size compared to the entire available area of the touch-sensitive display screen.

U.S. Pat. No. 6,567,549, in FIG. 7 thereof, illustrates the user interface of a palmtop computer, where the display has different limited writing areas, referred to as character input boxes 710, 760, 750. An important drawback of this solution is that it reserves a part of the display screen as special writing area, which cannot be used for other purposes. This special area cannot be too small since it must be able to contain the handwriting of characters and symbols. Particularly in mobile phones and other similar miniaturized devices, this becomes a serious problem, since the display screens of mobile phones are usually very small and the display screens must be used also for other purposes than receiving handwriting, namely for presenting both information and objects such as control elements of the user interface.

A second solution, which is illustrated in FIG. 5, is based on temporal information. Basically, for the following cases, the stylus will be recognized as a logical pen:

When there are one or more pen traces on the screen (step 510).

When there is no pen trace on the screen, the event circle contains at least one pen move event (step 520), and the duration $T_e$ between the pen down event and the first pen move event is less than a threshold $T_s$ (step 530).

For other cases, the stylus is considered as a logical mouse. Those cases can be concluded as follows:

When there is no pen trace on the screen and the event circle does not contain a pen move event.

When there is no pen trace on the screen, the event circle contains at least one pen move event but the duration $T_e$ between the pen down event and the first pen move event is not less than a threshold $T_s$.

Normally the threshold $T_s$ is very small, for example 0.5 seconds.

An important drawback of this solution is that it is not particularly friendly to users. For example, a small wobble of hand can accidentally change the meaning of actions. Thus, the rate of wrong actions could be rather high, especially in moving environments, like in a vehicle.

Another problem with known electronic handwriting equipment is how to handle different symbol sets (or character sets). The accuracy of the handwriting recognition is generally better for restricted symbol sets with a smaller number of symbols than for symbol sets with a larger number of symbols. Thus, Latin letters are normally included in one symbol sets (or in fact often two; upper case and lower case), Arabic numerals in another, Chinese characters in yet another, etc. The prior art generally suggests three different ways of selecting a desired symbol set for handwriting recognition:

1. Selecting a menu option in a graphical user interface.
2. Selecting/tapping a symbol set mode icon.
3. Writing a special symbol set control stroke that will restrict the interpretation of succeeding (or preceding) stylus strokes to a particular symbol set.

U.S. Pat. No. 6,567,549, which has been referred to above, is an example of solution 2. The leftmost character input box 710 is for inputting Japanese Kanji symbols, and the rightmost box 750 is for Arabic numerals. The center box 760 is a combined input box for inputting Japanese Hiragana characters, Japanese Katakana characters or Western Roman characters depending on the current input mode. The current input mode for the center box 760 is selected by the user by tapping the stylus on a corresponding Hiragana, Katakana or Roman mode box, these mode boxes being provided as graphical icons adjacently to the character input boxes.

All three of the above solutions have a common drawback in that they require an extra action from the user to select the desired symbol set. This is both in-convenient and will slow down the speed of handwriting input.

SUMMARY OF THE INVENTION

In view of the above, an objective of the invention is to solve or at least reduce the problems discussed above. In more particular, a purpose of the invention is to provide an improved manner of discriminating between logical pen mode and logical mouse mode that reduces the risk of accidental mode changes from logical mouse when logical pen is intended, and vice versa. Another purpose is to facilitate switching between different symbol sets for the handwriting recognition.

Generally, the above objectives and purposes are achieved by a apparatus and a method for handwriting recognition according to the attached independent patent claims.

A first aspect of the invention is an apparatus for handwriting recognition, the apparatus comprising:

a touch-sensitive display screen providing a handwriting input area capable of detecting a handwritten user input; and a processing device configured to interpret the handwritten user input as a symbol from a plurality of predefined symbols, wherein the handwriting input area includes a writing start area, wherein the processing device is configured to provide a visual indication of said writing start area on said display screen, and wherein the processing device is configured to interpret the user input as a symbol only if the user input starts within said writing start area.

As used herein, "handwritten user input" means a stroke, or a sequence of successive strokes entered within short time intervals, made onto the touch-sensitive display screen by way of a pen, stylus or any pen-like object including a user's finger or other body part. Such strokes are referred to as "pen strokes" in the remainder of this document.

Hence, according to the invention, a requisite for the processing device to perform interpretation of the user input as a symbol is that the pen stroke, or the first pen stroke in a sequence of successive strokes, starts within the writing start area, and in more particular that such pen stroke begins with a pen down event within the writing start area. As previously mentioned, this may be referred to as logical pen mode.

Thanks to the invention, a more accurate discrimination between logical pen mode and logical mouse mode will be obtained, thus both providing improved usability and facilitating faster handwriting input.

It is to be observed that the pen stroke, or the sequence of successive strokes, need not end within the writing start area but may on the contrary end anywhere within the handwriting input area, which advantageously is much larger than the writing start area and which may occupy a majority of the display screen or even essentially the entire display screen.

If the user input instead starts outside of said writing start area, the processing device may be configured to interpret the user input as a user interface control operation, such as a selection of a menu item, a selection of a graphical object such as a clickable button, check box or pop-up/pull-down field, a moving action for such an object, etc. As previously mentioned, this may be referred to as logical mouse mode.

Furthermore, the processing device may be configured to interpret the user input as a user interface control operation and not as a symbol if a pen down event within said writing start area is not followed by a pen move event within a prescribed time period. This will allow the writing start area to contain selectable objects such as control elements of the user interface, i.e. the entire handwriting input area is available for such purposes and therefore makes maximum use of the display screen.

Advantageously, the writing start area is considerably smaller than and has a fixed location within the handwriting input area. For instance, the writing start area may be shown as a little square or rectangular box with a different visual appearance than that of the background/handwriting input area, e.g. another color, grayscale tone or pattern. Such a little box may be included in a menu or status bar that anyway is included in the user interface for other reasons, such as for presenting status information and/or menus and menu options.

Alternatively, the writing start area may have an adaptive location within said handwriting input area, wherein the processing device will be configured to adjust the adaptive location depending on a current cursor position. Advantageously, in this way writing start area will each moment have a location that is near the display location where the user currently uses, or is likely to use, his stylus. As an alternative, the adaptive location may be adjustable by the user of the apparatus.

The processing device may be configured to display, on the display screen, a graphical trace representing a pen stroke prior to the interpretation thereof. Moreover, the processing device may be configured to display, on the display screen, the symbol when it has been interpreted from the pen stroke.

The plurality of predefined symbols may include a symbol set selected from the group consisting of: Latin characters, upper case characters, lower case characters, Arabic numerals, punctuation symbols, Cyrillic characters, Chinese characters, Japanese Kanji symbols, Japanese Hiragana characters and Japanese Katakana characters, and user-defined symbols.

In one embodiment, the plurality of predefined symbols includes a first symbol set and a second symbol set, and the writing start area comprises a first subarea and a second subarea, wherein said processing device is configured to interpret the user input as a symbol from said first symbol set if the user input starts within said first subarea, and as a symbol from said second symbol set if the user input starts within said second subarea. In other embodiments the plurality of predefined symbols may comprise a third symbol set (or even a fourth symbol set, fifth symbol set, etc), and the writing start area may comprise a third subarea (or even a fourth subarea, fifth subarea, etc), wherein said processing device is configured to interpret the user input as a symbol from said third symbol set (fourth symbol set, fifth symbol set, etc) if the user input starts within said third subarea (fourth subarea, fifth subarea, etc). These embodiments will allow switching between different symbol sets for the handwriting recognition in a user friendly and reliable manner.

The processing device advantageously includes a handwriting recognition engine which may be implemented as hardware, software or any combination thereof.

The apparatus may be a mobile terminal for a mobile telecommunications system, such as GSM, UMTS, D-AMPS or CDMA2000, or a portable/personal digital assistant (PDA), or another type of similar device.

A second aspect of the invention is a method for handwriting recognition in an apparatus that has a touch-sensitive display screen with a handwriting input area capable of detecting a handwritten user input. The method comprises the steps of:

providing a writing start area within said hand-writing input area;

visually indicating said writing start area on said display screen;

detecting a handwritten user input; and interpreting the user input as a symbol from a plurality of predefined symbols only if the user input starts within said writing start area.

The second aspect has generally the same features and advantages as the first aspect.

Other objectives, features and advantages of the present invention will appear from the following detailed disclosure, from the attached dependent claims as well as from the drawings.

BRIEF DESCRIPTION OF THE DRAWINGS

The present invention will now be described in more detail, reference being made to the enclosed drawings, in which.

DETAILED DESCRIPTION OF THE INVENTION

A telecommunications system in which the present invention may be applied will first be described with reference to FIG. 1. Then, the particulars of the apparatus and method according to embodiments of the invention will be described with reference to the remaining FIGS.

Figure 1:
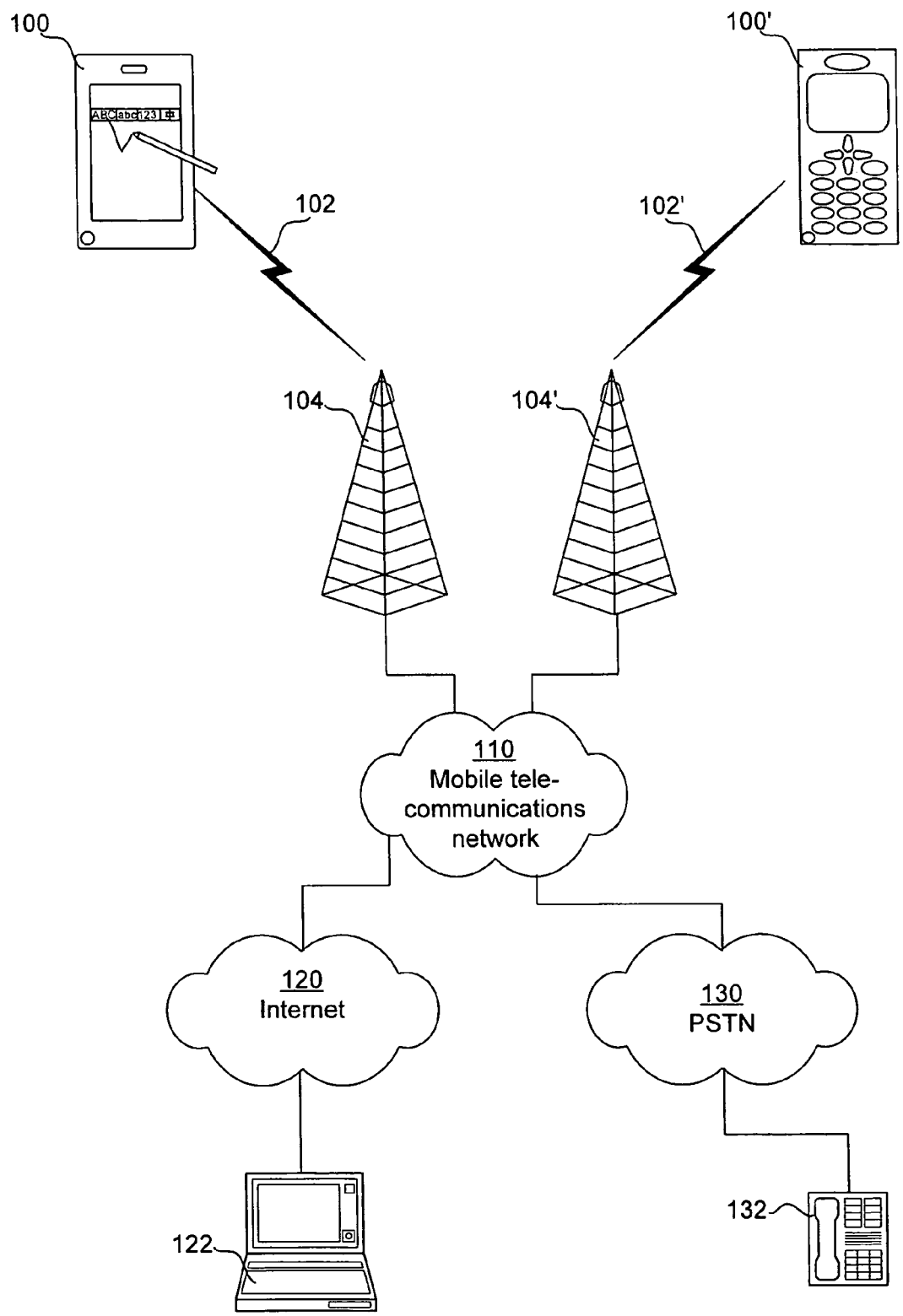
FIG. 1 is a schematic illustration of a telecommunications system, including a portable communication apparatus in the form of a mobile terminal, as an example of an environment in which the present invention may be applied.

In the telecommunications system of FIG. 1, various telecommunications services such as voice calls, data calls, facsimile transmissions, music transmissions, still image transmissions, video transmissions, electronic message transmissions and electronic commerce may be performed by way of a portable communication apparatus or mobile terminal 100. The apparatus 100 is connected to a mobile telecommunications network 110 through an RF link 102 via a base station 104, as is well known in the art. The mobile telecommunications network 110 may be any commercially available mobile telecommunications system, such as GSM, UMTS, D-AMPS or CDMA2000. The apparatus 100 is illustrated as a mobile (cellular) telephone but may alternatively be another kind of portable device, such as a portable/personal digital assistant (PDA) or a communicator. As will be explained in more detail with reference to FIG. 2, the apparatus 100 has a stylus-operated user interface including a touch-sensitive display screen onto which a user may enter handwritten information as well as operational commands by way of a stylus, pen or similar tool.

In the illustrated example, the apparatus 100 may be used for speech communication with users of other devices. Hence, speech may be communicated with a user of a stationary telephone 132 through a public switched telephone network (PSTN) 130 and the mobile telecommunications network 110, and with a user of another mobile terminal 100' which is connected to the mobile telecommunications network 110 over a wireless communication link 102'.

The mobile telecommunications network 110 is operatively connected to a wide area network 120, which may be Internet or a part thereof. Thus, the apparatus 100 may access a computer 122 connected to the wide area network 120 in accordance with specified protocols (such as TCP, IP and HTTP) and appropriate application software (such as a WAP or WWW browser, an email or SMS application, etc) in the apparatus 100.

The system illustrated in FIG. 1 serves exemplifying purposes only.

Figure 2:
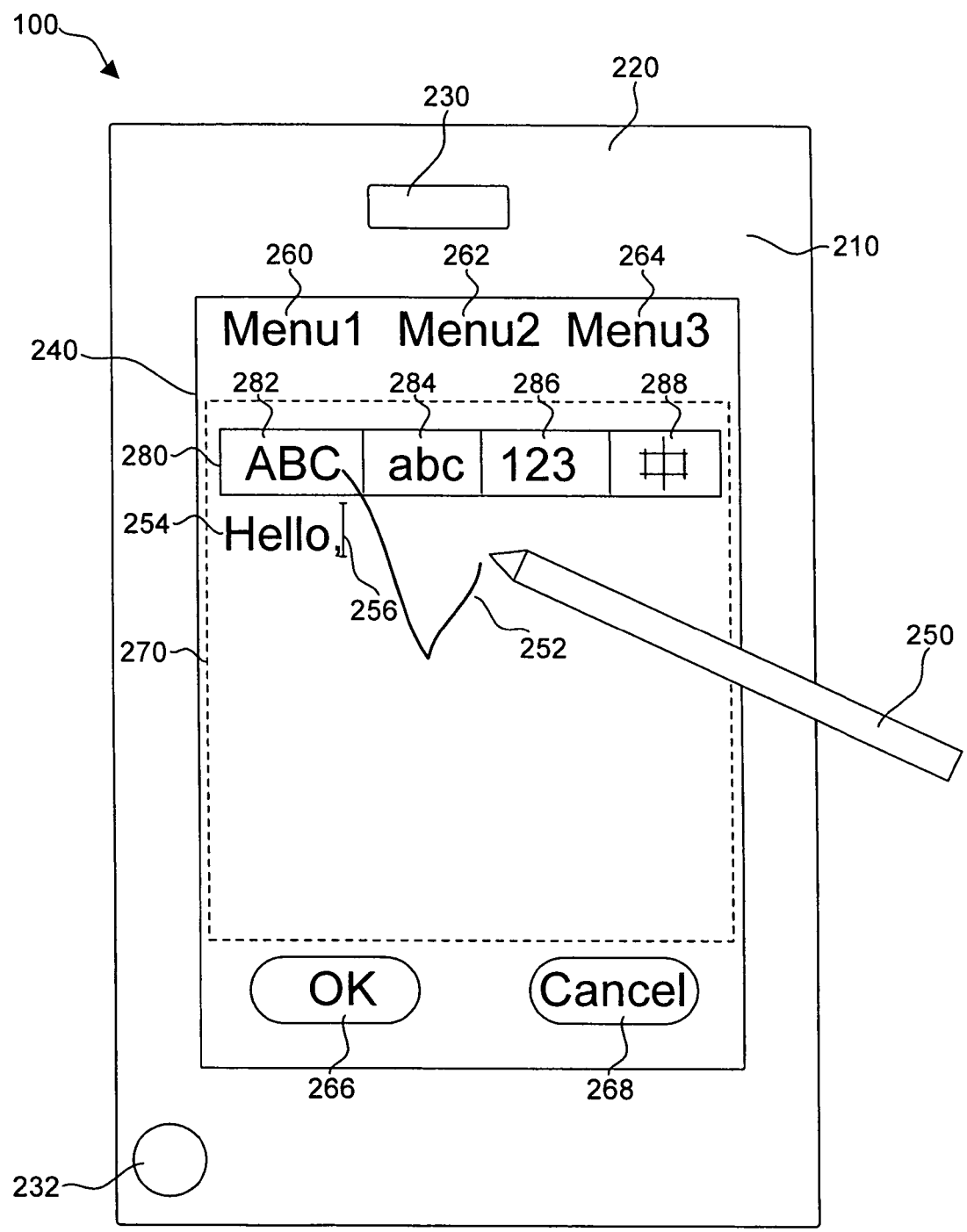
FIG. 2 is a schematic front view of the mobile terminal of FIG. 1, illustrating in more detail its user interface which includes a touch-sensitive display screen for operation by way of a pen, stylus or similar tool.

FIG. 2 illustrates the apparatus 100 of FIG. 1 in more detail. The apparatus 100 has an apparatus housing 210. A front surface 220 of the portable communication apparatus 100 has a speaker 230, a microphone 232 and a touch-sensitive display screen 240. As is well known in the art, the touch-sensitive display screen 240 constitutes not only an output device for presenting visual information to the user, but also an input device.

In more particular, by pointing, tapping or dragging a stylus 250 on the display screen 240, the user may use the stylus 250 as a logical mouse to control the user interface of the apparatus 100 by e.g. scrolling and selecting in different menus 260, 262, 264 and their menu options, setting the position of a cursor 256 on the display screen 240, selecting different selectable elements such as icons or click buttons 266, 268, etc.

Moreover, the stylus 250 may be used as a logical pen to enter handwritten information within a handwriting input area 270. In the embodiment of FIG. 2, the hand-writing input area 270 is indicated as a dashed rectangle and occupies a majority of the available presentation area of the display screen 240. The handwritten information may be entered into various software applications, such as a messaging application (email, SMS, MMS), a calendar application, a contacts application, etc. As is illustrated in FIG. 2, a symbol 252 is currently being written in the form of at least one pen stroke with the stylus 250 on the display screen. A graphical trace is presented on the display screen to represent the hand-written input. When a complete pen stroke, or a sequence of pen strokes written at short time intervals, has been written, a handwriting recognition engine in the apparatus 100 will start interpreting the handwritten input to identify a symbol, out of a predefined symbol set, that best matches the handwritten input. After successful interpretation, the recognized symbol is presented in "plain text" at the cursor 256 and replaces the graphical trace 252. In FIG. 2, the characters "H-e-l-l-o" and the punctuation symbol "," have been successfully interpreted prior to the currently written symbol 252.

As will be explained in more detail later, only if the handwritten input starts within a handwriting start area 280 will the apparatus 100 assume a logical pen mode and will the handwritten input be processed by the handwriting recognition engine as a symbol out of a pre-defined symbol set. If on the other hand the handwritten input starts outside of the handwriting start area 280, the apparatus 100 will instead assume a logical mouse mode and the handwritten input will not be processed by the handwriting recognition engine as a symbol out of a predefined symbol set.

In FIG. 2, the handwriting start area 280 is divided into four subareas 282-288, that represent the following respective symbol sets: upper-case Latin letters, lower-case Latin letters, Arabic numerals and Chinese characters. If the handwritten input 252 starts in subarea 282, it will be processed by the handwriting recognition engine as a symbol out of a pre-defined symbol set consisting of upper-case Latin letters. If the handwritten input 252 starts in subarea 284, it will be processed as a symbol among lower-case Latin letters. If it starts in subarea 286, it will be processed as a symbol among Arabic numerals, and if it starts in subarea 288, it will be processed as a symbol among Chinese characters.

Figure 3:
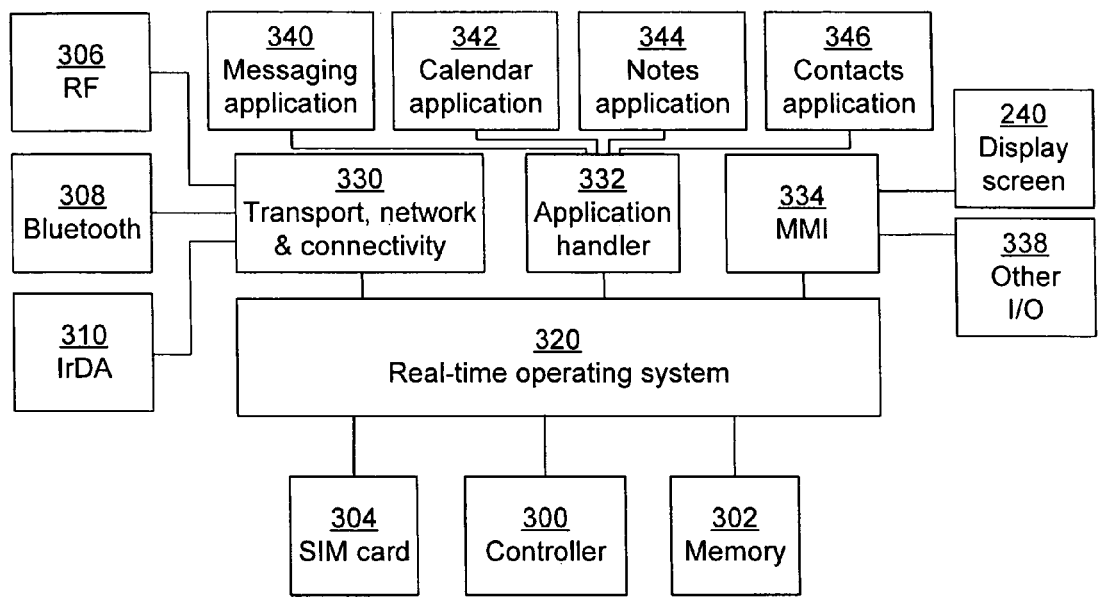
FIG. 3 is a schematic block diagram of the hardware and software structure of the mobile terminal of FIGS. 1 and 2.
Figure 4:
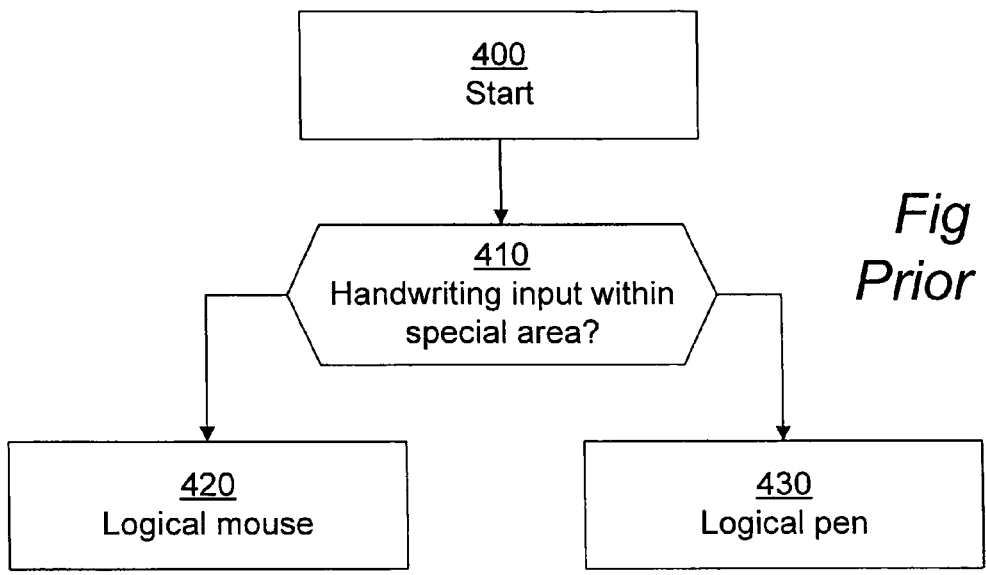
FIGS. 4 and 5 represent prior art methods of discriminating between logical mouse mode and logical pen mode in handwriting recognition.
Figure 5:
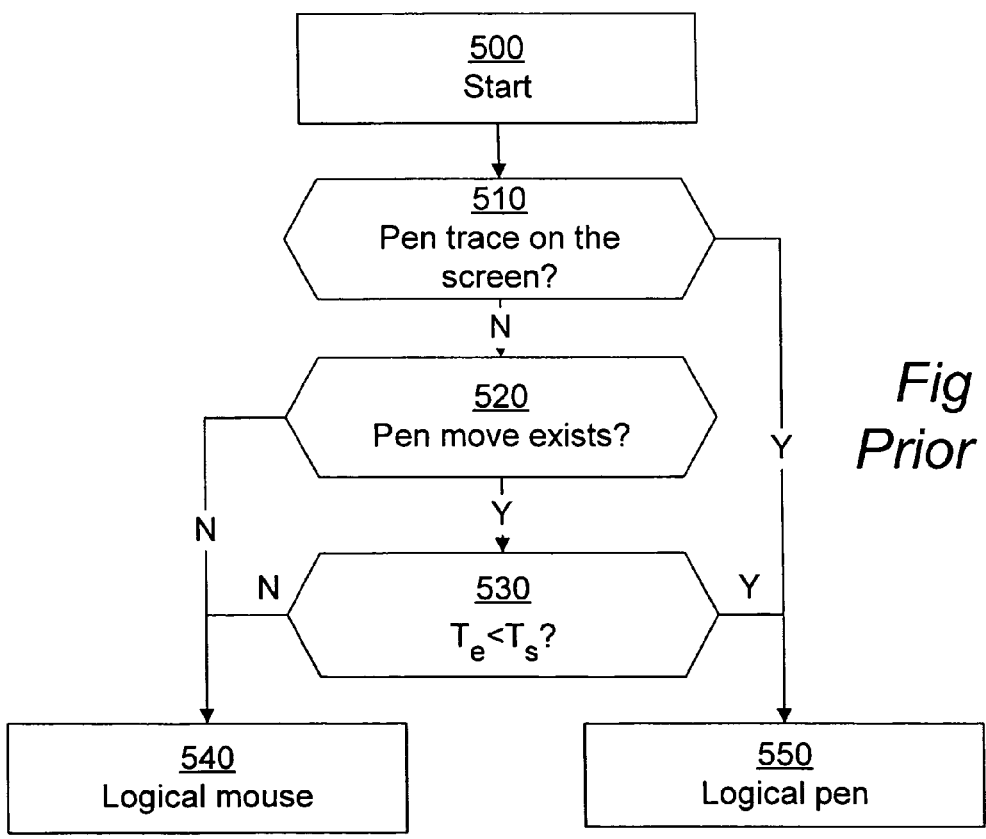

FIG. 3 illustrates the internal structure of the apparatus 100. A controller 300 is responsible for the overall operation of the apparatus and is preferably implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data and program instructions for various software in the portable communication apparatus. The software includes a real-time operating system 320, man-machine interface (MMI) drivers 334, an application handler 332 as well as various applications. The applications include a messaging application 340, a calendar application 342, a notes application 344 and a contacts application 346, as well as various other applications which are not referred to herein. The MMI drivers 334 cooperate with various MMI or input/output (I/O) devices, including the display screen 240 and other input/output devices 338 such as a camera, a keypad, the microphone 232, the speaker 230, a vibrator, a joystick, a ringtone generator, an LED indicator, etc. As is commonly known, a user may operate the apparatus through the man-machine interface thus formed.

The handwriting recognition engine may be included in said set of MMI drivers 334 or may be provided as separate software executable by the controller 300. A large variety of existing handwriting recognition algorithms and products, software-based and/or hardware-based, may be used to implement the handwriting recognition engine, as is readily realized by the skilled person.

The software also includes various modules, protocol stacks, drivers, etc., which are commonly designated as 330 and which provide communication services (such as transport, network and connectivity) for an RF interface 306, a Bluetooth interface 308 and an IrDA interface 310. The RF interface 306 comprises an internal or external antenna as well as appropriate radio circuitry for establishing and maintaining a wireless link to a base station (e.g. link 102 to base station 104 in FIG. 1). As is well known to a man skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The apparatus 100 also has a SIM card 304 and an associated reader. As is commonly known, the SIM card 304 comprises a processor as well as local work and data memory.

The handwriting input referred to above may be received and used for various purposes in a variety of applications, including aforesaid messaging, calendar, notes and contacts applications 340, 342, 344 and 346, as well as for instance an Internet browser application, a WWW browser application, a WAP browser application, a phonebook application, a camera application, an image recordal application, a video recordal application, an organizer application, a video game application, a calculator application, a voice memo application, an alarm clock application, a word processing application, a code memory application, a music player application, a media streaming application, and a control panel application, or any other application which uses at least one field for text, character or symbol input.

Figure 6:
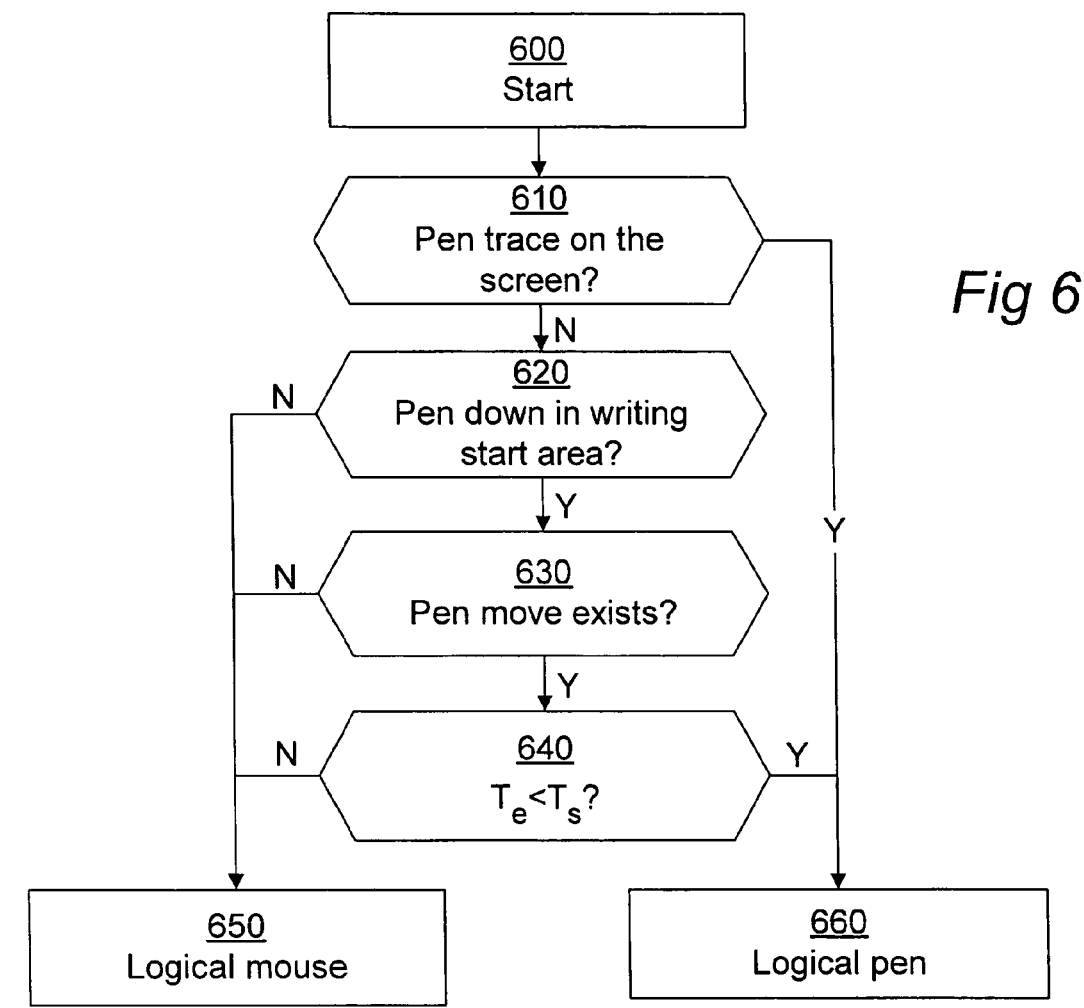
FIGS. 6 and 7 represent embodiments of the invention for discriminating between logical mouse mode and logical pen mode in handwriting recognition.

A first embodiment of the handwriting recognition method according to the invention will now be presented with reference to FIG. 6. This embodiment allows the writing start area 280 to contain selectable objects such as control elements 260-268 of the user interface. In other words, the entire handwriting input area 270 is available for such purposes and therefore makes maximum use of the display screen. The embodiment reliably identifies the user's stylus input as a logical pen mode in the following cases:

When there has already been at least one pen trace 252 in the handwriting input area 270 (step 610; this means that a symbol is currently being input and that a second stylus stroke will be included in the handwriting recognition, even if that stroke starts outside of the writing start area 280).

When there is no pen trace 252 in the handwriting input area 270, the pen down happens in the writing start area 280 (step 620), the event circle has at least one pen move event and the duration $T_e$ between the pen down and the first pen move event is smaller than a threshold $T_s$.

Otherwise, all pen events will be considered as logical mouse events. These cases can be summarized as:

When there is no pen trace 252 in the handwriting input area 270 and the pen down happens outside of the writing start area 280 (steps 610 and 620).

When there is no pen trace 252 in the handwriting input area 270, the pen down happens in the writing start area 280, but the event circle does not have a pen move event (step 630). Hence, if the user taps on an object which lies within the handwriting input area 270, he may still select that object without confusing such a logical mouse action with writing a dot as a logical pen action.

When there is no pen trace 252 in the handwriting input area 270, the pen down happens in the writing start area 280, the event circle has at least one pen move event but the duration $T_e$ between the pen down and the first pen move event is larger than or equal to a threshold $T_s$ (step 640). Hence, the user may not only select an object in the writing start area 280 but also move (drag) it without confusing this with a logical pen action, provided that he waits for the threshold period $T_s$ to lapse before he moves the stylus.

Figure 7:
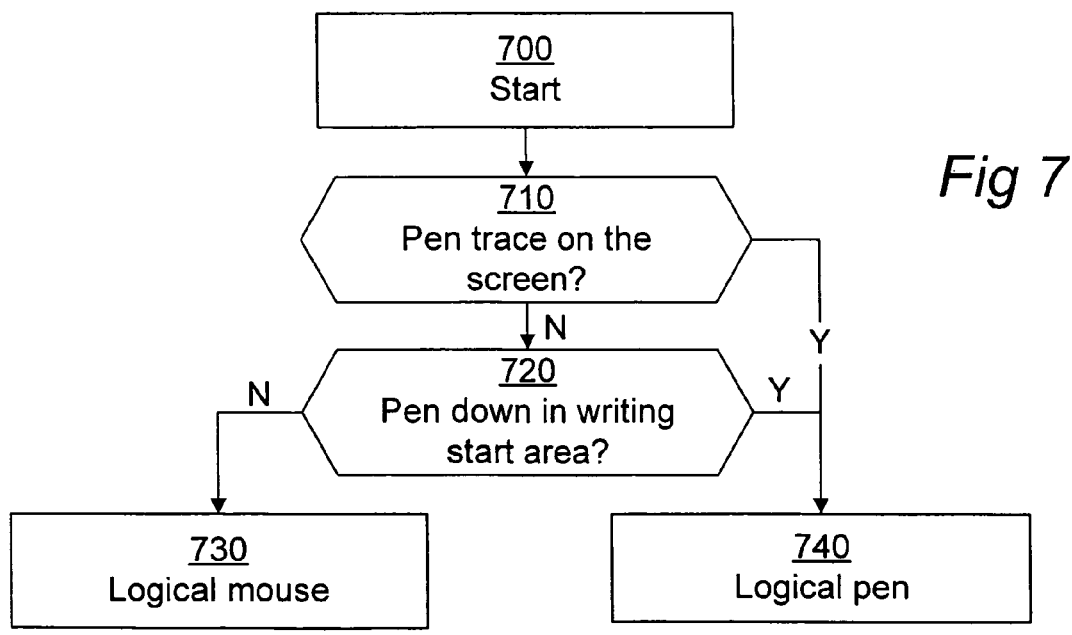

A second embodiment of the handwriting recognition method according to the invention will now be presented with reference to FIG. 7. This embodiment provides a simpler implementation, since it will not allow the writing start area 280 to contain selectable objects. The embodiment reliably identifies the user's stylus input as a logical pen mode in the following cases:

When there has already been at least one pen trace 252 in the handwriting input area 270 (step 710).

When there is no pen trace 252 in the handwriting input area 270 and the pen down event happens in the writing start area 280 (steps 720 and 740).

The case when the stylus will be considered as a logical mouse is:

When there is no pen trace 252 in the handwriting input area 270 and the pen down event happens outside of the writing start area 280 (steps 720 and 730).

The writing start area 280 may be designed in many different ways. It may be divided into an arbitrary number of subareas (2, 3, 4 (as in FIG. 2), 5, 6, . . . ), each representing a respective symbol set as described above. It may however also consist of only one area, representing either a particular symbol set (as selected by any of the prior art methods 1-3 referred to in the introductory section of this document), or a single general symbol collection (in applications where it is not necessary to divide the available symbols into different sets).

Moreover, the writing start area 280 may have a fixed location on the display screen (as shown in FIG. 2) or an adaptive. If the writing start area 280 has a fixed location, in may in some embodiments be included in a status or menu bar which also includes status information such as battery level, RSSI (Received Signal Strength Indicator), date, time, application name, document name, number of characters in a document, etc, and/or selectable menus.

If the writing start area 280 has an adaptive location, its location may for instance follow the current cursor position, so that the writing start area will always be conveniently near the screen position where the user input takes place.

The writing start area 280 need not necessarily be designed as a horizontal bar but have other geometrical forms, for instance a vertical bar, a circle or a square box. If the writing start area 280 is a square box and has subareas, such subareas may be positioned like quadrants in a coordinate system.

The invention has mainly been described above with reference to a few embodiments. However, as is readily appreciated by a person skilled in the art, other embodiments than the ones disclosed above are equally possible within the scope of the invention, as defined by the appended patent claims.

What we claim is:

1. An apparatus for handwriting recognition, the apparatus comprising:
    a touch-sensitive display screen providing a handwriting input area capable of detecting a handwritten user input; and
    a processing device configured to interpret the handwritten user input as a symbol from a plurality of predefined symbols,
    wherein the handwriting input area includes a writing start area, and wherein said writing start area is substantially smaller than said handwriting input area;
    wherein the processing device is configured to provide a visual indication of said writing start area on said display screen, and
    wherein the processing device is configured to interpret the user input as a symbol from the plurality of predefined symbols only if the detected user input is a pen down event within said writing start area and continues as a pen move event in the handwriting input area within a predetermined period of time.

2. An apparatus as in claim 1, the apparatus having a user interface in which the display screen is included, wherein the processing device is configured to interpret the user input as a user interface control operation and not as a symbol if the user input starts outside of said writing start area.

3. An apparatus as in claim 2, wherein the processing device is further configured to interpret the user input as a user interface control operation and not as a symbol if a pen down event within said writing start area is not followed by a pen move event within a prescribed time period.

4. An apparatus as in claim 1, wherein said writing start area has a fixed location within said handwriting input area.

5. An apparatus as in claim 1, wherein said processing device is configured to adjust the location of said writing start area depending on a current cursor position.

6. An apparatus as in claim 1, wherein said location of said writing start area is adjustable by a user of the apparatus.

7. An apparatus as in claim 1, wherein said handwriting input area is formed by a majority of the display screen's available presentation area.

8. An apparatus as in claim 1, wherein said handwriting input area is formed by essentially the entire display screen's available presentation area.

9. An apparatus as in claim 1, said user input including at least one pen stroke, wherein said processing device is configured to display, on said display screen, a graphical trace representing said at least one pen stroke prior to the interpretation thereof.

10. An apparatus as in claim 9, wherein said processing device is configured to display, on said display screen, said symbol when it has been interpreted from said at least one pen stroke.

11. An apparatus as in claim 1, wherein said plurality of predefined symbols includes a symbol set selected from the group consisting of: Latin characters, upper case characters, lower case characters, Arabic numerals, punctuation symbols, Cyrillic characters, Chinese characters, Japanese Kanji symbols, Japanese Hiragana characters and Japanese Katakana characters, and user-defined symbols.

12. An apparatus as in claim 1, said plurality of predefined symbols including a first symbol set and a second symbol set, and said writing start area comprising a first subarea and a second subarea, wherein said processing device is configured to interpret the user input as a symbol from said first symbol set if the user input starts within said first subarea, and as a symbol from said second symbol set if the user input starts within said second subarea.

13. An apparatus as in claim 12, said plurality of predefined symbols further comprising a third symbol set, and said writing start area further comprising a third subarea, wherein said processing device is configured to interpret the user input as a symbol from said third symbol set if the user input starts within said third subarea.

14. An apparatus as in claim 1, in the form of a mobile terminal for a mobile telecommunications system.

15. An apparatus as in claim 1, in the form of a portable/personal digital assistant (PDA).

16. A method for handwriting recognition in an apparatus that has a touch-sensitive display screen with a handwriting input area capable of detecting a handwritten user input, the method comprising:
    providing a writing start area within said handwriting input area, wherein said writing start area is substantially smaller than said handwriting input area;
    visually indicating said writing start area on said display screen;
    detecting a handwritten user input; and
    interpreting the user input as a symbol from a plurality of predefined symbols only if the user input starts as a pen down event within said writing start area and continues as a pen move event in the handwriting input area within a predetermined period of time.

17. A method as in claim 16, wherein, instead of interpreting the user input as a symbol, the user input is interpreted as a user interface control operation and not as a symbol if the user input starts outside of said writing start area.

18. A method as in claim 17, wherein the user input is further interpreted as a user interface control operation and not as a symbol if a pen down event within said writing start area is not followed by a pen move event within a prescribed time period.

19. A method as in claim 16, further comprising adjusting a location of said writing start area within said handwriting input area depending on a current cursor position.

20. A method as in claim 16, wherein said user input includes at least one pen stroke, the method further comprising displaying, on said display screen, a graphical trace representing said at least one pen stroke prior to the interpretation thereof.

21. A method as in claim 20, further comprising displaying, on said display screen, said symbol when it has been interpreted from said at least one pen stroke.

22. A method as in claim 16, wherein said plurality of predefined symbols includes a symbol set selected from the group consisting of: Latin characters, upper case characters, lower case characters, Arabic numerals, punctuation symbols, Cyrillic characters, Chinese characters, Japanese Kanji symbols, Japanese Hiragana characters and Japanese Katakana characters, and user-defined symbols.

23. A method as in claim 16, wherein said plurality of pre-defined symbols include a first symbol set and a second symbol set, and said writing start area comprises a first sub-area and a second sub-area, the method further comprising interpreting the user input as a symbol from said first symbol set if the user input starts within said first subarea, and as a symbol from said second symbol set if the user input starts within said second subarea.

24. A method as in claim 23, wherein said plurality of predefined symbols further comprises a third symbol set, and said writing start area further comprises a third sub-area, the method further comprises interpreting the user input as a symbol from said third symbol set if the user input starts within said third sub-area.

* * * * *